United States Patent [19]

Jones

[11] Patent Number: 4,516,528
[45] Date of Patent: May 14, 1985

[54] FISH GROWING SYSTEM

[76] Inventor: J. Phillip Jones, Star Rte., Box 328, Gila Bend, Ariz. 85337

[21] Appl. No.: 441,603

[22] Filed: Jan. 4, 1983

[51] Int. Cl.³ .............................................. A01K 61/00
[52] U.S. Cl. ........................................................ 119/3
[58] Field of Search ........................................ 119/3, 5

[56] References Cited

U.S. PATENT DOCUMENTS

| | | | |
|---|---|---|---|
| 518,318 | 4/1894 | Hoxsie | 119/3 |
| 518,319 | 4/1894 | Hoxsie | 119/3 |
| 2,944,513 | 7/1960 | Keely | 119/3 |
| 3,116,712 | 1/1964 | Ogden et al. | 119/3 |
| 3,166,043 | 1/1965 | Castillo | 119/3 |
| 4,267,798 | 5/1981 | Collins | 119/3 |

Primary Examiner—Hugh R. Chamblee
Attorney, Agent, or Firm—LaValle D. Ptak

[57] ABSTRACT

A commercial fish-growing system particularly adapted for use at the head waters of irrigation systems comprises an elongated, level ditch having a cross-section in the form of an inverted trapezoid as a fish-growing raceway. Water for the irrigation system is supplied to an aeration raceway in which the water is subjected to a violent tumbling action as it passes down the aeration raceway. After the water exits the aeration raceway, it enters the fish raceway. At the outlet end of the fish raceway, an underwater spillway slopes upwardly from the bottom of the pool in which it is located to a lip located below the water level in the fish raceway; and a cofferdam is spaced from and is parallel to the sloping spillway surface. The cofferdam also is spaced from the pool bottom a predetermined distance, so that water and solid wastes exiting from the fish raceway flow upwardly from the bottom along the sloping spillway surface to be dumped out over the lip of the spillway.

14 Claims, 12 Drawing Figures

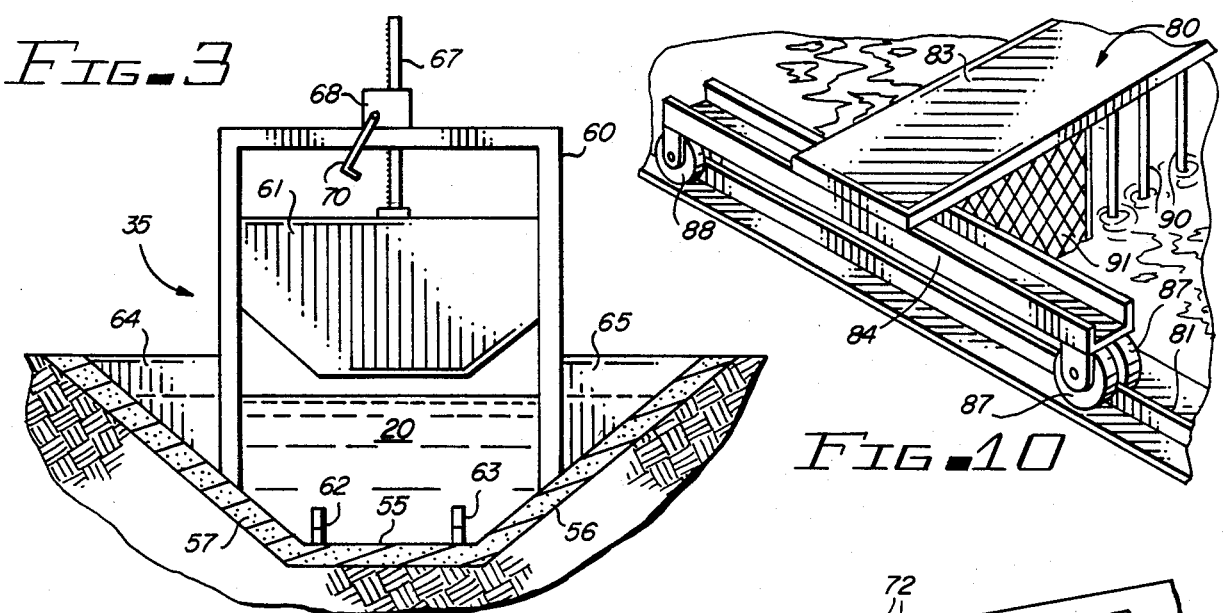
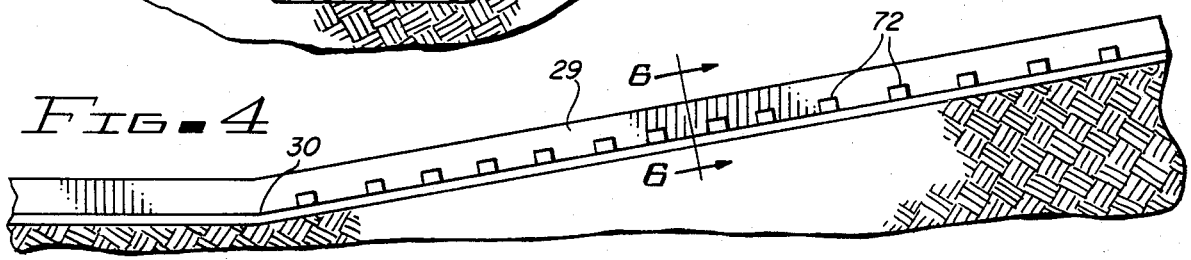
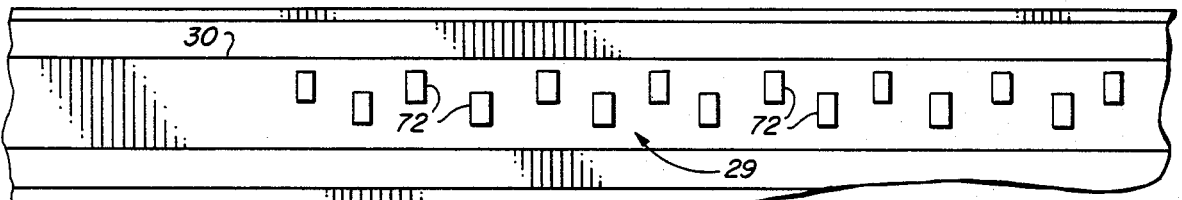
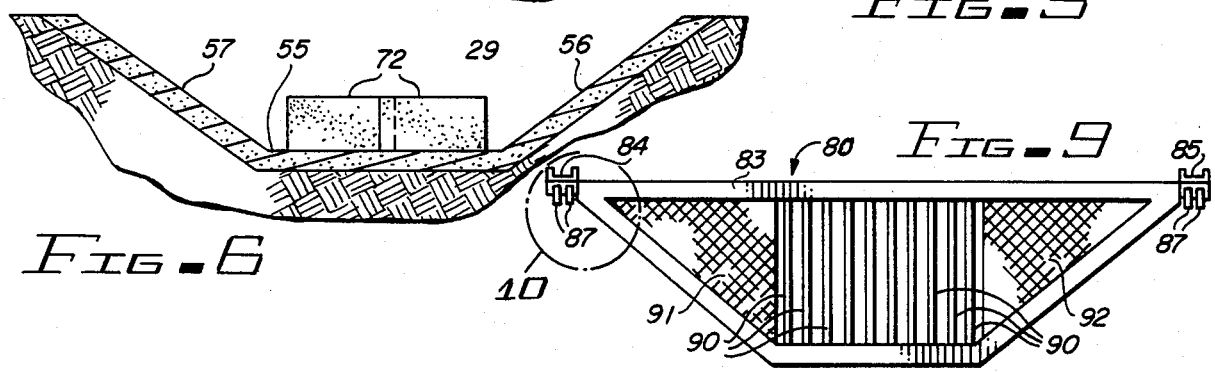
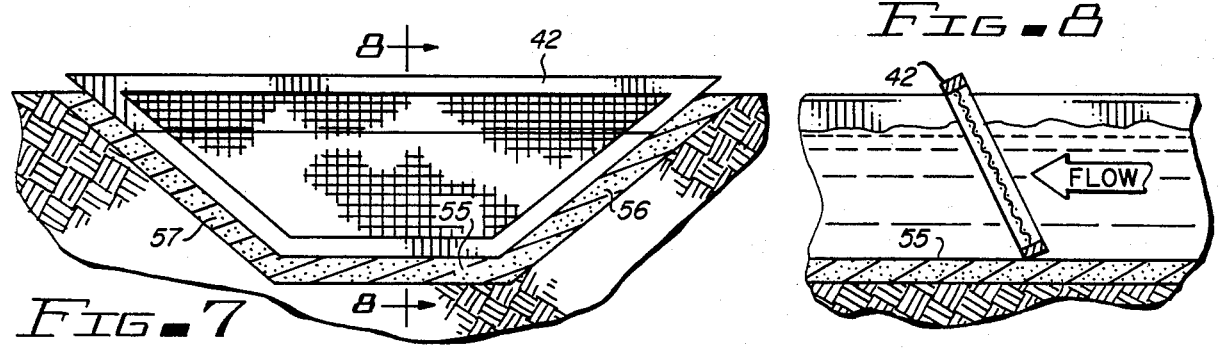

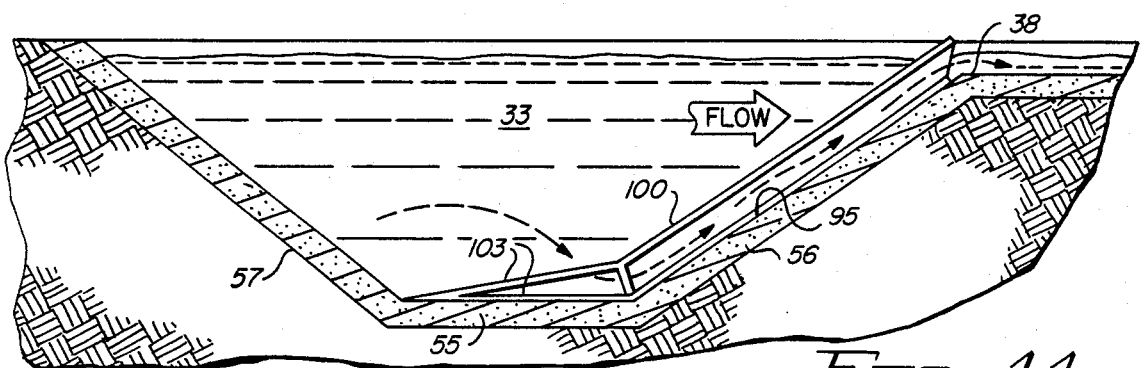
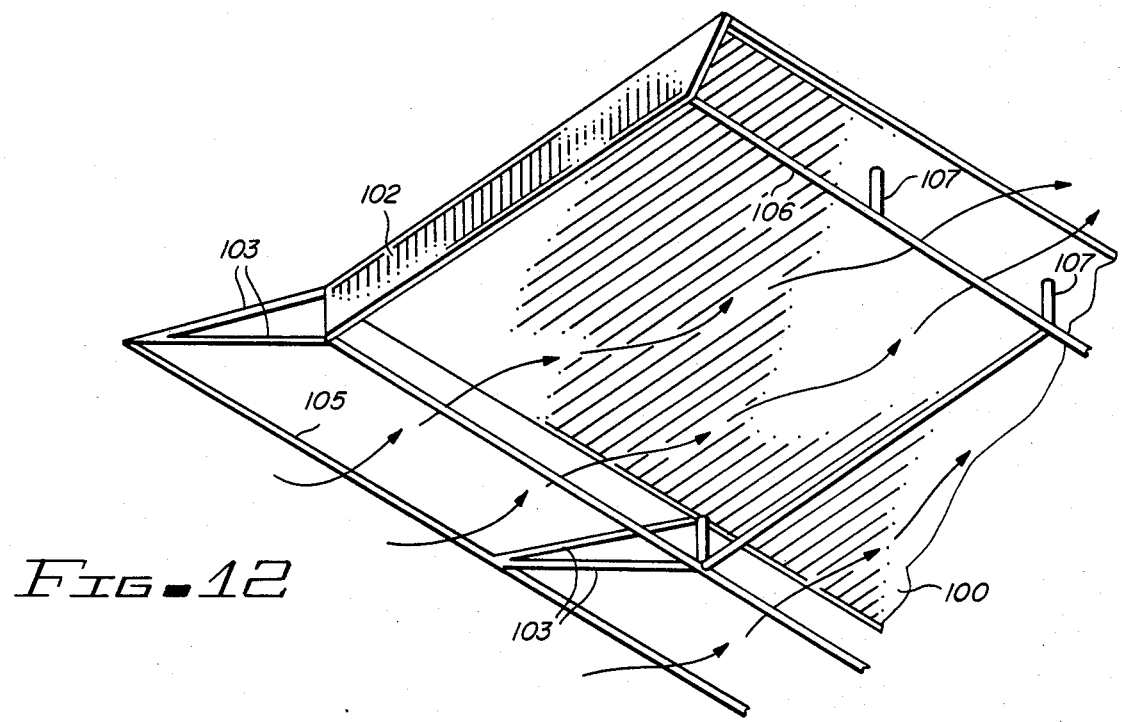

FISH GROWING SYSTEM

BACKGROUND OF THE INVENTION

A major source of food for people in nations around the world is fish. Although highly sophisticated techniques for raising crops (such as grain and vegetables), animals (such as cattle, pigs and sheep), and poultry (such as chickens and turkeys) for human food consumption have evolved over the years, the manner in which fish are obtained for food has changed little over the centuries. Generally, fish grow wild in streams, lakes, and in the oceans, and various techniques for catching these fish for consumption are employed. Commercial fishing operations, while employing more sophisticated boats, nets, and other equipment, still primarily rely upon the hunting, finding, and then netting of fish in the wild to harvest them for eventual human consumption. To obtain fish in this manner is expensive and dependent upon many variables often out of the control of the fishermen themselves. Consequently, obtaining of a reliable regular source of supply of any seafood has not existed.

In addition, the world-wide supply of seafood, particularly gathered from the oceans, is rapidly dwindling due to overfishing by many nations. Consequently, there is a very urgent need to develop techniques for raising fish in a controlled environment, of the types which have been employed for many years in conjunction with the raising of meat animals and poultry. Some types of fish, such as catfish, have been found to be readily adaptable to "fish farm" or controlled growing and harvesting methods to produce a relatively large quantity of fish meat from a relatively small area.

"Fish farms" in the past often simply comprised large ponds supplied with fresh water to make up for that lost through evaporation and into the ground. A problem exists, however, when large numbers of fish are raised in a relatively confined pond since the fish produce significant amounts of solid and liquid wastes. For pond operations, periodic cleaning of the pond bottom to remove the solid wastes produced by the fish must be done to prevent the pond from becoming incapable of use to grow further crops of fish. Often, this required draining the pond. This cleaning is time consuming, expensive, difficult, and messy.

It is necessary, but difficult, to provide a sufficient oxygen content in the water to prevent illness and death of the fish in a pond operation which could result in disastrous financial loss for the "fish farm" operator. Oxygen is provided by the interaction of wind over the water surface; and, if an emergency arises where this is insufficient, air may be temporarily bubbled through the water. Generally, pond culture fish farms require approximately one acre to support 2,000 to 2,500 pounds of fish. Thus, for a large-scale operation, many acres are required.

To reduce the area required for a fish farm operation, the growing of fish, such as catfish and trout in elongated channels or raceways using a combination of recirculating water from the raceway and additional make-up water dropped over a waterfall or the like to aerate the water, have been employed in the past. Waterfall oxygenation systems, however are very inefficient. Thus, systems for bubbling oxygen through the water or for pressurized introduction of oxygen gas to the water have been employed. These systems are expensive. The construction of concrete raceways having a rectangular or circular cross-sectional configuration is generally employed. In the dimensions required for raising fish (approximately six to eight feet wide and four feet deep), it has been necessary to use reinforced concrete. The cost of the raceways is very high and in many cases prohibitive.

Consequently, there is a need for a relatively inexpensive intensive culture system for growing fish in a confined space with efficient oxygenation of the water and which further is self-cleaning to remove wastes produced by the fish.

SUMMARY OF THE INVENTION

Accordingly, it is an object of this invention to provide an improved fish farm system.

It is an additional object of this invention to provide an improved moving water fish farm system.

It is another object of this invention to provide an improved combination crop irrigation system and fish farm system which produces optimum growing conditions for the fish and enhances the characteristics of the water supplied to crops for crop growing purposes.

It is a further object of this invention to provide an improved self-cleaning commercial fish growing system.

It is yet another object of this invention to provide an improved self-cleaning fish growing system which recirculates at least a portion of the water in the system to maximize the use of the water quality in a moving water fish growing raceway.

In accordance with the preferred embodiment of the invention, a self-cleaning fish growing system includes a fish raceway in the form of an elongated ditch having a water inlet end and a water outlet end. Water is supplied at a predetermined flow rate to the inlet end of the ditch, and the system is further constructed in a manner to continuously remove solid wastes and water from the bottom of the outlet end of the ditch to continually self-clean the ditch.

In a more specific form, the ditch which constitutes the fish raceway ditch has a cross-sectional configuration in the form of an inverted trapezoid, and a bottom feeding spillway/cofferdam combination is used to remove solid wastes and water from the bottom of the outlet end of the ditch and supply the wastes and water effluent from the fish raceway.

BRIEF DESCRIPTION OF THE DRAWINGS

FIG. 3 shows details of a gate used in the system of FIG. 1;

FIG. 4 is a side-elevational, cross-sectional view of a portion of the system shown in FIG. 1;

FIG. 5 is a top view of the same portion of the system shown in FIG. 4;

FIG. 6 is a cross-sectional view taken along the line 6—6 in FIG. 4;

FIG. 7 illustrates details of a feature of the embodiment shown in FIG. 1;

FIG. 8 illustrates additional features of the device shown in FIG. 7;

FIG. 9 illustrates details of another device used in conjunction with the embodiment shown in FIG. 1;

FIG. 10 shows additional details of the encircled portion "10" shown in FIG. 9;

FIG. 11 is a cross-sectional view taken along the line 11—11 of FIG. 1; and

FIG. 12 shows details of a portion of the device shown in FIG. 11.

DETAILED DESCRIPTION

Figure 1:
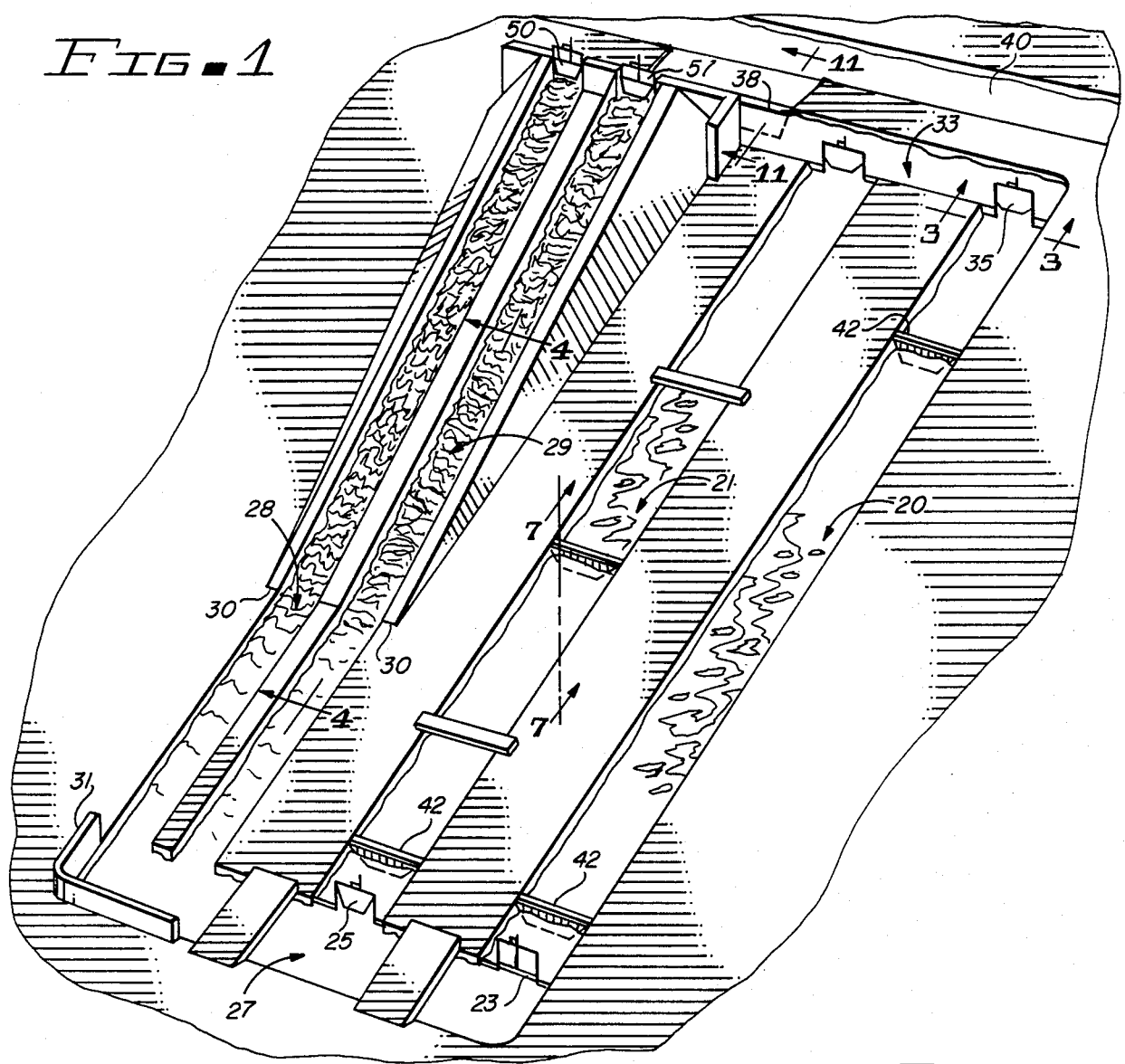
FIG. 1 is an aerial perspective view of a preferred embodiment of a fish growing system in accordance with the invention.

Reference now should be made to the drawings in which the same reference numbers are used throughout the various figures to designate the same or similar components. FIG. 1 is an over-all aerial perspective view of the complete fish farm system and is particularly useful in understanding the layout and relative positions of the different components of the system.

As illustrated in FIG. 1, the fish growing system includes two parallel fish growing raceways 20 and 21. Although the particular dimensions of the raceways may be varied for different operating conditions and for growing different amounts of fish, a typical length of each of the raceways 20 and 21 is four hundred feet. The raceways themselves are provided with a water inlet end which may be closed off or opened in varying amounts by a pair of gates 23 and 25, respectively. As illustrated in FIG. 1, the gate 23 is partially closed and the gate 25 is fully opened. These gates communicate with a water inlet channel 27 which is located at right angles to the lengths of the fish growing raceways 20 and 21.

The channel 27, in turn, is provided with water which cascades down a pair of aeration raceways 28 and 29 in which the water is tumbled and turned to aerate it to increase its oxygen supply and to remove carbon dioxide and gases such as nitrogen amonia from recirculated water in the system. As can be seen from FIG. 1, the water inlet end (the end in the upper left-hand corner of FIG. 1) of the aeration raceways 28 and 29 is elevated with respect to the supply channel 27 and the fish growing raceways 20 and 21. The channel 27 and the raceways 20 and 21 are level, with no longitudinal angular drop or rise. In a fish growing system of the type having the dimensions mentioned previously, the upper end or water inlet end of the aeration raceways 28 and 29 typically has an elevation of approximately eight and one-half feet above the water exit end. With fish growing raceways 20 and 21 of four hundred feet in length, this eight and one-half foot drop takes place over a length of approximately three hundred and seventy feet to the inlet end 30 of a flat area in both of the aeration raceways 28 and 29 which extends straight out from the ends of the aeration raceways for approximately another thirty feet. This is done to avoid hydraulic jump in the water after it finishes the drop from the upper end of the raceways 28 and 29 to the lower end of these raceways. This flat thirty-foot section terminates in the channel 27. A low wall 31 is placed at the end of the flat portions of the raceways 28 and 29 and along the opposite side of the channel 27 to contain any splashing or jump which may still exist in the water as it reaches this point in the system.

Water leaving the fish growing raceway channels 20 and 21 exits through a channel or pool 33 disposed at right angles to the ends of the channels 20 and 21. Some of this water is returned to recirculating pumps located at the head of the raceways 28 and 29.

The channels 27 and 33 are of comparable cross-sectional configuration to the fish raceway or fish growing channels 20 and 21 and are of equal depth of the channels 20 and 21. The exit ends of the fish growing raceways 20 and 21 also are controlled by a pair of gates 35 and 36 which may be opened or closed to prevent water from exiting from the channels 20 and 21 or to prevent any backwater flow from going into one or the other of these channels in the event that only one channel is in operation at any given time.

Water in the exit channel or pool 33 is returned to recirculating pumps located at the head of the raceways 28 and 29, and a portion of the total amount of water supplied through the system is returned through these pumps to be recirculated down the raceways 28 and 29. This recirculated water is depleted somewhat in oxygen and also includes gaseous contaminants in the form of carbon dioxide and ammonia which are vented by the aeration raceways 28 and 29 in a manner described in greater detail subsequently. A portion of the water exiting from the fish growing raceways 20 and 21 into the pool 33 also is removed from the system entirely through a bottom feeding spillway which serves to flush out the solid wastes produced by the fish in the fish growing raceways 20 and 21. The water and suspended wastes flowing outwardly from the spillway passes over a lip 38 into a canal 40, which typically is an irrigation canal used in irrigating crops and the like.

The fish in the raceways 20 and 21 are confined between spaced pairs of screens 42 which create "pens" the size of which can be varied in accordance with the number of fish located in each raceway or the number and types of fish to be grown between different sets of screens 42 in the same raceway. The screens 42 themselves have wire mesh grating in them to permit the water flowing through the raceways 20 and 21 to pass through them. The mesh apertures are selected to be of a size smaller than the size of the fingerlings or smallest fish which are to be confined within the pens defined by adjacent pairs of screens 42.

Figure 2:
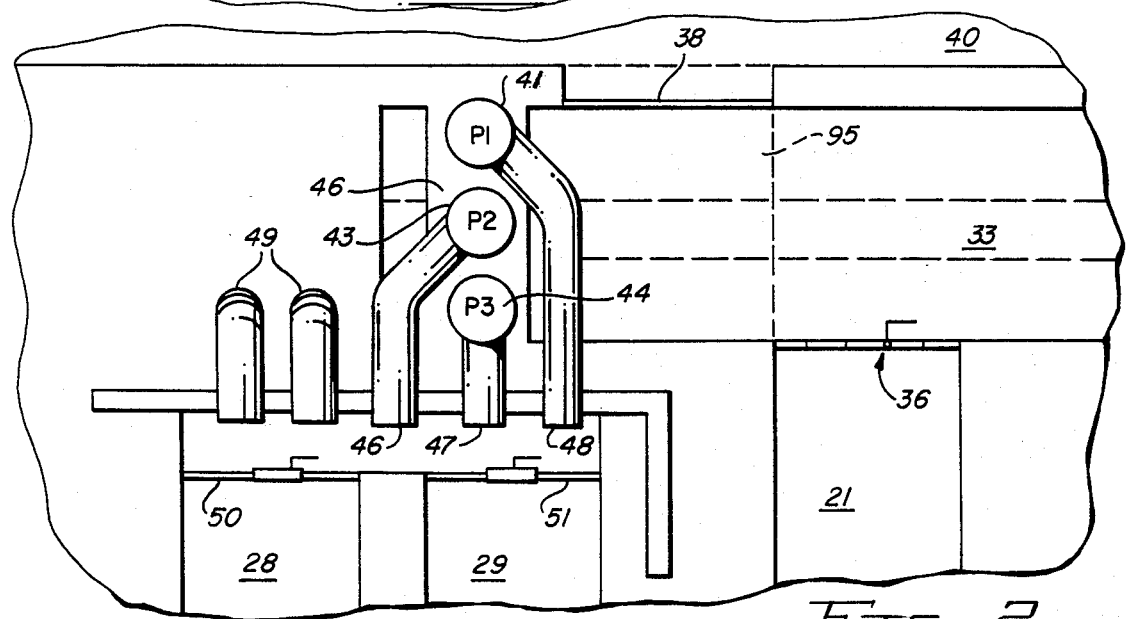
FIG. 2 is a top view of a portion of the system as shown in FIG. 1.

In FIG. 2, there is illustrated a top elevational view of the portion of the system constituting the water inlet side of the aeration raceways 28 and 29 along with the outlet end of the fish growing raceway 21, the outlet pool 33, and the lip of the spillway 38. As is illustrated in FIG. 2, three recirculating pumps 41, 43, and 44 are located on a bridge 46 which extends over the top of the left-hand end of the outlet pool 33. These pumps extend into the water in the outlet pool 33 and are used to return at least a portion of the water initially flowing down the raceways 28 and 29 back to the upper end of these raceways through three corresponding outlet pipes 46, 47, and 48 to the inlet ends of the raceways 28 and 29.

In addition to the water which is recirculated in the system and supplied through any one or more of the recirculating pumps 41, 43, and 44, new "make-up" water also is supplied from a suitable source (such as an underground irrigation well) through the pipes 49 to the water inlet end of the aeration raceways 28 and 29. The total amount of water which is supplied from all of the pumps and the make-up water supply 49 may be varied in accordance with the water flow desired through the fish growing raceways 20 and 21 as well as depending upon whether only one or both of these raceways are being used at any given time to raise fish. The ratio of new "make-up" water to be recirculated water also may be varied so that the optimum operating conditions for operating the fish growing raceways 20 and 21 may be achieved. Typically, the ratio of recirculated water to new "make-up" water is approximately 4:1. The water in excess of that which is recirculated and evaporated from the system flows out into the irrigation canal 40 through the spillway 38 to flush away the solid wastes which are removed from the fish growing raceways 20 and 21. The amount of water flowing over the spillway 38 is approximately equal to the water supplied by the "make-up" water supply through the pipes 49 to the heads of the aeration channels with a minimal of loss due to evaporation, splashing, etc.

The raceways 28 and 29 also may be selectively opened and closed by means of vertical gates 50 and 51, respectively. These gates are the same type as the gates 23, 25, 35, and 36 which are used at the respective inlet ends and outlet ends of the fish growing raceways 20 and 21. A typical construction of the gates used in all of these locations is shown in FIG. 3 which illustrates the details of the gate 35. It is to be understood, however, that this illustration for gate 35 applies equally as well to the other ones of these six gates.

When the system is in full operation, the gates 50 and 51 are in their full open position as illustrated for the gate 35 shown in FIG. 3. This permits all of the water supplied from the pumps 41 through 44 and from the "make-up" water supplied through the pipes 49 to be substantially, equally divided at the inlet ends of the raceways 28 and 29 prior to the aeration of this water in these raceways. To obtain a proper balance between the amount of water supplied in the two raceways 28 and 29, the relative sizes of the openings provided by gates 50 and 51 may be adjusted if necessary. Obviously, if one or the other of these raceways is not in use, the gate 50 or 51 for the unused raceway is closed so that all of the water supplied flows through the other raceway 28 or 29. This feature permits maintenance and repair to be done on one or the other of the raceways without shutting down the entire system.

FIG. 3 shows a typical cross-section for all of the raceways and the inlet channel 27 and the outlet pool 33 which are used in the system. Each of these portions of the system are constructed in the form of a trapezoidal ditch and preferably are made by the use of standard slip-form irrigation ditching equipment. Such equipment is used throughout the Southwest for the building and construction of concrete irrigation ditches. The ditches are made in the form of inverted trapezoids, as is most clear in FIGS, 3, 6, and 7, having a flat bottom 55 and a pair of opposing sidewalls 56 and 57. The trapezoidal ditch is an equilateral ditch as illustrated in FIGS. 3, 6, and 7; but an equilateral construction is not necessary. The side slope of the ditch may vary with a range of horizontal to vertical ratio of 1:1 to 2:1. In a commercial installation which currently is being operated, this ratio is 1.25:1. The depth of the ditch may range between 0.5 feet to 6.0 feet with a wall thickness of unreinforced concrete of 1.5 inches to 3.0 inches. The bottom width of the bottom section 55 typically ranges between 0.5 feet to 6.0 feet, and the depth may be varied to whatever depth is necessary or desired for the particular use of the ditch either as a fish growing raceway or as an aeration raceway or the like.

In a commercial facility which currently is under operation, the bottom width of the section 55 of the fish growing raceways 20 and 21 is 2 feet. The depth of water flowing through the raceways 20 and 21 is four feet, and the sides 56 and 57 have a side slope ratio of 1.25:1. The raceways 20 and 21 also have a level or zero longitudinal slope. The wall thickness in this facility is two inches for both sidewalls 56 and 57 as well as the bottom 55.

A particular advantage to using the inverted trapezoidal cross-sectional configuration of the ditch is that no reinforcement is necessary in the concrete since strong lateral support for both the bottom and sides is provided by the earth in which the ditch is formed. If ditches having a semi-circular cross-section or a rectangular cross-section are constructed, it is necessary for any raceways having the volume of the ones described above to be made of reinforced concrete. This significantly increases the costs of such alternative forms of construction by nearly an order of magnitude over the cost of constructing the raceways and ditches as illustrated in FIGS. 3, 6, and 7.

The gates used in the inlet and outlet sections of each of the various raceways shown in FIG. 1 typically are constructed as illustrated in FIG. 3. The gate 35 is shown as an example, but all six of the gates 23, 25, 35, 36, 50, and 51 may be of similar construction. This essentially comprises an inverted open-bottomed, rectangular frame 60 which has a pair of opposing vertical posts bridged at the top by a horizontal beam. The lower ends of the posts are anchored in opposite sidewalls 56 and 57 of the raceway in which the gate is placed. Each of the vertical portions of the support frame 60 has a groove for guiding a gate plate 61 for vertical travel in these grooves. The plate 61 is shaped at the bottom to mate with the bottom 55 and the lower portions of the sidewalls 56 and 57 of the raceway. In the bottom 55 of the raceway, two pairs of spaced-apart vertical extending guide posts 62 and 63 are provided to hold the bottom of the gate plate 61 in place against pressure of water applied against it. On opposite sides of the frame 60, a pair of inverted triangular plates 64 and 65 fill the space between the frame 60 and the respective sidewalls 56 and 57 to prevent any water flow past these points in the gate structure.

A vertically extending lift rod 67 is attached to the top of the gate plate 61 approximately at its center and extends through a hole in the horizontal portion of the frame 60 where it is engaged by a suitable drive gear mechanism 68 to permit raising and lowering of the plate 61 under control of a crank 70. Although a manual crank arrangement is shown in FIG. 3, it is obvious that other mechanisms or devices for raising and lowering the plate 61 may be employed. The particular structure used to accomplish the raising and lowering of the plate 61 is not important.

The aeration raceways 28 and 29 have comparable configurations and dimensions to the fish growing raceways 20 and 21. Because of the faster rate of flow of water through these raceways as compared to the flow rate through the fish growing raceways 20 and 21, however, the aeration raceways 28 and 29 do not need to be as deep as the fish growing raceways. In constructing the raceways 28 and 29 with slip from ditching equipment, the slip forms used in the equipment are simply set for a shallower depth. All other characteristics and parameters are the same as for the use of the similar equipment to form the fish growing raceways 20 and 21.

FIGS. 4, 5, and 6 illustrate in greater detail the structure of the aeration raceway 29. It is to be understood that the aeration raceway 28 is identical in all respects to the raceway 29. In the portion of the aeration raceways 28 and 29 which extends from the upper end where water is introduced into the raceways to the point 30 at which the raceways level out to eliminate the hydraulic jump in the water existing from them, the bottom of the raceways have staggered rows or a zigzag row of vertical obstructions, preferably in the form of concrete blocks 72 setup on end, attached to the bottom 55 of the aeration raceways 28 and 29. These obstructions or concrete blocks are staggered in a zigzag pattern which is shown most clearly in FIG. 5, and the blocks 72 are spaced relatively close together (from one to two feet apart). The offset between the two rows of blocks 72 (as viewed from the end such as in FIG. 6) is essentially the width of a block or slightly greater. The use of this construction, in conjunction with the approximately eight and one-half foot drop the water takes from the upper end of the aeration raceways 28 and 29 to the point 30, causes a violent tumbling action of the water as it passes down the aeration raceway ditch.

The aeration attributes for the raceways 28 and 29 are set by the incline of the aeration raceway (as indicated above eight and one-half feet drop in a three hundred seventy foot run) and by then creating a high roughness coefficient within the raceway. This, of course, is provided primarily by the concrete block 72 as shown in FIGS. 4, 5 and 6. These parameters are used to control the velocity of the water flow down the aeration raceways from a minimum of two feet per second to a maximum of six feet per second. Within a given aeration raceway 28 or 29, the water velocity varies according to the volume of flow, but in a typical system, it generally ranges between 2.5 feet per second to 4.5 feet per second. In a system having the dimensions mentioned above, this indicates a Mannings roughness coefficient of approximately 0.048.

It has been found that the aeration which takes place down the length of the drop of the aeration raceways 28 and 29 processes the water to approximately eighty percent of saturation at any local temperature, barometric pressure, and humidity from any beginning point of oxygen saturation. At the same time, the raceways 28 and 29 are very efficient in venting gases such as nitrogen ammonia and carbon dioxide from the recirculated water which is mixed with the "make-up" water as described previously. This is due, in part, to the relatively long flow time taken by the water as it moves down the raceway 28 and 29.

The water leaving the aeration raceways 28 and 29 then enters the inlet channel 27 from which it is supplied through the inlet gates 23 and 25 to the fish growing raceways 20 and 21. The dimensions of the raceways mentioned above are calculated to support a working weight range of fish in each of the raceways 20 and 21 of approximately 25,000 pounds. This amounts to approximately 30,000 fish (such as catfish) in each raceway varying from fingerling size to a harvest size of approximately two pounds each in weight. The number of fish for this average working weight of fish in any given raceway will, of course, vary for different species of fish raised in the system.

It has been found that much additional oxygen is obtained in the fish raceways 20 and 21 themselves as a result of the velocity of water flowing through these raceways (between 0.2 feet to 2.5 feet per second) and the activity of the fish swimming within the trapezoid-shaped water column. The effect is one of a constant fast exchange rate with respect to the surface of the water which is constantly churning. The volume of oxygen picked up in this manner is difficult to measure because the fish are constantly using varying amounts of oxygen while, at the same time, helping to reoxygenate the water. It is estimated, however, that a full fifty percent of the total oxygen needs of the fish are met within the fish raceways 20 and 21 themselves.

As stated previously, the fish are confined in pens between spaced pairs of meshed screens 42, the details of which are shown most clearly in FIGS. 7 and 8. The screens 42 have a frame in the shape of a mating trapezoidal configuration to the inverted trapezoidal cross-section of the fish growing raceways 20 and 21. The size of the fish pens may be varied at will at any point along the length of the fish growing raceways 20 and 21. To do this, the screens 42 are simply dropped in place in the channel with the lower end extending in the direction of the water flow through the channel as shown in FIG. 8. The water flow and gravity then wedges the screen 42 firmly in place against the bottom and sidewalls of the raceway 20 or 21 where it remains until it is lifted up and moved to a new location. Thus, there is no necessity for guide grooves in the walls of the raceways or any other special provisions for holding the screens 42 in place. They can be placed anywhere.

With a working weight range of approximately 25,000 pounds of live-weight fish in each of the raceways 20 and 21, a weekly harvest of the largest fish in each raceway is effected during operation of the system. For a catfish growing operation, this harvest occurs when the largest fish reach approximately two pounds each in weight. As the larger fish are removed, new smaller fingerlings are continuously added to the fish population in each raceway.

While it would appear theoretically that all of the fish from a given fingerling size would grow at approximately the same rate, this is not the case. Some of the fish mature at different times. Thus, it has been found inefficient to attempt to segregate the fish by the length of time they have been present in the raceway and more efficient simply to mix the entire fish population of all sizes together in a single pen for each different type of fish being grown in a particular raceway. When this is done, however, the harvesting of the largest fish requires some means of segregating and separating these fish quickly and readily from the smaller fish since there is a continual population of approximately 30,000 fish in each raceway; and only approximately 2,500 of these fish are removed at each harvest.

To effect the harvest, a grader/sorter gate 80 is employed. The details of this grader/sorter gate 80 are shown in FIGS. 9 and 10. To accommodate this device, a track 81 (shown most clearly in FIG. 10) extends adjacent to and parallel to the edge of each side of each of the fish growing raceways 20 and 21. The grader/sorter 80 then has a bridging top member 83 which holds the frame 80 vertically in close relation to (but not touching) the bottom 55 and sides 56 and 57 of the fish growing raceway 20 or 21 with which it is being used. Each of the opposite ends of the member 83 rests on an elongated support channel member 84 and 85 which, in turn, is supported at opposite ends by a pair of spaced-apart roller pairs 87 and 88 (shown most clearly in FIG. 10). These roller pairs straddle the rails 81 on opposite sides of the fish growing raceway to permit the grader/sorter 80 to be pulled or pushed along the raceway.

The central portion of the grader/sorter 80 has a number of parallel, vertical bars 90 extending from the bridge member 83 to the base which is moved adjacent the bottom 55 of the raceway channel 20 or 21 with which the grader/sorter is being used. The triangular areas on opposite sides of this central portion are closed off by a mesh or grid 91 and 92 having spacings comparable to those in the screens 42 used to form the pen in which the fish are grown. The spacings between the bars 90 in the grader/sorter 80 are selected to permit smaller fish to pass readily between them. These spaces, however, are also selected to prevent the larger fish (those which are to be harvested) from passing through.

In operation, the grader/sorter 80 is placed into the water adjacent the upstream screen 42 directly in back of the screen. The grader/sorter 80 then is moved downstream to a position closely adjacent the downstream screen 42 used to form the other end of the pen in which the fish are grown. Once this has been accomplished, the smaller fish all remain upstream of the grader/sorter 80, and the fish which are to be harvested are between the grader/sorter 80 and the downstream screen 42 of the pen. These confined fish are then dipped out of this area by the use of dip nets and the like and are transferred to suitable storage tanks or a tanker truck. The fish then are either moved directly and live to market or are taken to a processing plant where they are prepared for market.

In the operation of a system of the type disclosed with the fish population as described, approximately 4,500 pounds per week of two-pound catfish are continuously harvested from the system when it is in full operation. To maintain the 25,000 pounds of live-weight fish in each raceway, approximately ¾ ton of feed per day for each of the raceways 20 and 21 is necessary to feed the fish. The feed used is a typical sinking-type pellet fish feed.

It is apparent from the foregoing that the large amount of live weight of fish and the large amount of feed which is supplied to these fish each day results in a substantial amount of solid wastes produced by the fish in the system. The production of such solid waste is a constant problem in most fish growing operations since the wastes themselves deprive the water of oxygen and must be removed in some manner. For most fish growing operations, the removal of the wastes is periodically effected by closing down a portion of the system and physically scooping the wastes out and hauling them away. The disadvantages of handling solid wastes in this manner are readily evident, and the expense is significant.

By the use of the inverted trapezoidal cross-sectional configuration for the fish raceways, a self-cleaning operation of the fish growing raceways 20 and 21 is accomplished. The swimming action of the fish within the raceways continually stirs up the offal produced by the fish as well as any excess feed which may be left over as the result of any given feeding operation. This solid material then is kicked upwardly onto the sides of the raceway, and the moving action of the water plus the churning provided by the fish causes it to once again roll down the sides but always moving toward the exit end of the raceway 20 or 21 until it reaches the bottom. The action of the fish then stirs the material back up again, and the cycle repeats causing the solid materials to follow a generally sinusoidal pattern or path as these materials move from the water inlet end of the raceway 20 or 21 to the water outlet end.

Another advantage of the trapezoidal configuration of the raceway is that, when the fish are feeding, the excess feed is kicked up from the bottom and thrown up on the sides. Here, the smaller fish readily spot this feed and are able to feed off the sides even though they may be driven from the feed at the bottom by the larger fish. In addition, it is possible for an operator of the system to visually observe any changes in feeding conditions by the movement of excess feed through the raceway while the fish are feeding. Consequently, adjustments in feed quantity may be made immediately. This is not possible with a raceway which is of rectangular cross-sectional configuration.

After the water, with the suspended solid waste materials in it, exits from the exit gates 35 and 36 at the ends of the fish growing raceways 20 and 21, it enters the outlet pool or channel 33 from which a portion of it is recirculated by the pumps 41 through 44, as described previously. Not all of the water, however, is recirculated.

The excess water flows out of the pool 33 along a bottom feeding spillway slope 95 to the spillway lip 38 which is located approximately two inches below the water level of the outlet pool or ditch 33. To cause this bottom feeding action to take place, a cofferdam or underwater spillway feeding device is utilized, and this is shown most clearly in FIGS. 11 and 12. The cofferdam device comprises a steel plate 100 which extends from a position above the water level parallel to the surface 95 and terminates approximately six inches from the bottom 55 of the outlet pool or ditch 33. The plate 100 extends the full width of the spillway lip 38 and slightly beyond the lip 38 on each side. Side plates 102 are attached to each of the ends of the plate 100 and extend vertically from the plane of the lower surface of the plate 100 approximately six inches. This structure then rests on the slope 95 (which simply constitutes the "spillway" portion of the sidewall 56 of the pool 33) to essentially seal off the spillway slope 95 between the end plates 102.

An open framework, however, is provided to hold the bottom edge of the plate 100 spaced from the bottom of the pool 33. This framework is in the form of a triangular support or brace 103 which rests on and extends across the bottom 55 of the ditch 33 to prevent the plate 100 from sliding downwardly and closing off the opening at the bottom. Depending upon the width of the spillway surface 95, various numbers of the triangular support braces 103 may be employed. The ends of these supports which are opposite to the plate 100 are interconnected by means of a rod 105 which provides structural rigidity to the entire "cofferdam" structure illustrated in FIGS. 11 and 12. At the upper end, a similar rod 106 extends from the lower edge of one side plate 102 to the other, and the spacing of this rod from the upper edge of the plate 100 is ensured by spaced-apart, vertical support members 107 illustrated most clearly in FIG. 12.

Thus, the water flowing over the lip of the spillway 38 enters from the bottom of the pool 33 and flows between the plate 100 and the underwater spillway surface 95 to exit as indicated by the dotted line flow shown in FIG. 11. This flow also is indicated by the arrow in FIG. 12 which shows the manner in which the water and suspended solid waste materials pass beneath the plate 100 to exit between the plate 100 and the rod 106 spacing the upper end of the plate 100 from the upper edge of the underwater spillway surface 95. This withdrawing of the excess water and suspended waste materials from the bottom of the pool 33 ensures a continuous self-cleaning operation of the system. These waste materials then are dumped into the irrigation canal 40 as described previously and are applied to the fields for which the irrigation water is intended.

That portion of the water which is not withdrawn over the spillway lip 38 is recirculated by the pumps 41 to 44 and mixed with new make-up water. Some of the waste does not remain large enough to take advantage of this automatic waste removal cycle and is recirculated by the pumps 42 to 44. This waste, however, is suspended by turbulence and flow rate and still goes out the spillway eventually while fresh water continuously is being introduced into the system. Thus, there is created a cycle of constant dilution of the water in the system with new or fresh water. The dilution rate is designed to maintain a constant removal of waste without contamination of the water. It has been found, for a system of the type which has been described above, that a dilution rate equal to ninety percent of the water being completely exchanged within four hours provides a very adequate operation and one which is satisfactory so far as the oxygen content and the ability to support the above-described fish population is concerned. With this system, it is not necessary to clean out the raceways at any time during continuous operation.

In a fish growing system which has been operated commercially to grow catfish, the following dimensions and operating parameters of the various components are used:

A. Characteristics of fish growing raceways 20 and 21:
  Bottom width—2 feet
  Depth—4 feet
  Slide slope—1.25:1
  Longitudinal slope—0
  Length—400 feet
  Wall thickness—2 inches
B. Aeration raceways 28 and 29:
  Longitudinal slope—0.0238:1
  Depth—2 feet
  Bottom Width—2 feet
  Wall thickness—2 inches
  Side slope—1.25:1
  Length—370 feet drop plus 30 feet
C. Area covered by entire system—approximately 2.5 acres.

Each of the two fish growing raceways 20 and 21 in this commercial operation were designed to carry 5,000 gallons per minute of water at a 0.46 feet per second velocity. As mentioned above, one of these raceways is being operated at 6,800 gallons per minute at a velocity of 0.62 feet per second with excellent results (that is, better oxygen uptake and waste removal). The desired velocity of water within any of the fish raceways is dependent upon the species raised and the particular dimensions of the raceway. This velocity, as mentioned above, generally falls between 0.2 feet per second to 2.5 feet per second. The recirculation pumps stationed at the head of the aeration raceways 28 and 29 consist of two 20 H.P. and one 10 H.P. electric motors coupled to high volume, low head, propeller pumps. One of 20 H.P. electric propeller pumps is on standby emergency and also is connected to a gas engine in order to provide pumped water in the case of electrical power failure. The recirculation flow along with the fresh water input creates the desired velocities and oxygenation for complete utilization of the water. Utilization in this sense means to a point of undesired pollution, namely ammonia.

The foregoing description, taken in conjunction with the various figures of the accompanying drawings, is to be considered as illustrative of the features of the invention and not as limiting. Other variations may occur to those skilled in the art without departing from the true scope of the invention.

What is claimed is:

1. A self-cleaning aquaculture growing system including in combination:
  a raceway in the form of an elongated ditch having a water inlet end and a water outlet end;
  means for supplying water at a predetermined flow rate to the inlet end of said ditch; and
  a bottom feeding spillway means adjacent the outlet end of said ditch, said spillway means including a spillway lip located below the water level at the outlet end of said ditch, and a coffer dam means above the water level surrounding the spillway lip, said coffer dam means extending downwardly to a predetermined distance above the bottom of said ditch adjacent the spillway lip, whereby said spillway lip and said cofferdam means operate to continuously remove solid wastes and water from the bottom of the outlet end of said ditch.

2. The combination according to claim 1 further including a pool section attached to and communicating with the outlet end of said ditch and having said bottom feeding spillway therein located on the side thereof opposite the side communicating with the outlet end of said ditch.

3. The combination according to claim 2 wherein said means for supplying water comprises means for recirculating a predetermined amount of the water exiting the outlet end of said ditch and combining such recirculated water with a predetermined amount of fresh makeup water to compensate for water removed with the solid wastes from the bottom of the outlet end of said ditch.

4. The combination according to claim 2 wherein said bottom feeding spillway comprises an underwater spillway surface sloping upwardly from the bottom of said pool section to said spillway lip located below the water level in said pool section, and said cofferdam means extends downwardly to a predetermined distance above the bottom of the pool adjacent the lower end of the spillway surface.

5. The combination according to claim 4 wherein said cofferdam means comprises a main plate mounted parallel to and spaced from the sloping surface of said bottom feeding spillway and extending above the normal water level of water in said pool section and above said spillway lip and further including first and second end plates between said main plate and said sloping surface of said spillway, with said main plate spaced from the bottom of said pool section a predetermined distance to permit water and solid wastes to flow thereunder and between said main plate and said spillway surface out over the lip of said spillway to continuously remove solid waste material at a predetermined flow rate of water from said pool section.

6. The combination according to claim 5 further including means for aerating the water supplied by said water supply means prior to entrance of said water into the inlet end of said ditch.

7. The combination according to claim 6 wherein the aeration means comprises an inclined aeration raceway with an inlet end and an outlet end, wherein the outlet end is interconnected with the inlet end of said elongated ditch of said fish raceway and the inlet end is elevated above the outlet end thereof by a predetermined distance, and including means in said aeration raceway from causing a violent tumbling action of the water passing therethrough.

8. The combination according to claim 7 wherein said elongated ditch of said fish raceway has no slope from end to end.

9. A system for raising fish and enhancing the fertilizing characteristics of irrigation water supplied to fields for growing crops including in combination:
a source of irrigation water;
a fish growing raceway in the form of an elongated ditch having an inlet end and an outlet end;
means for supplying water from said source of irrigation water to the inlet end of said fish growing raceway; and
spillway means at the outlet end of said elongated ditch of said fish growing raceway for continuously removing solid wastes and water solely from the bottom of said outlet end and supplying enriched water to a field for irrigation, said spillway means including a spillway lip located below the water level at the outlet end of said ditch and a cofferdam means above the water level surrounding said spillway lip, said cofferdam means extending downwardly to a predetermined distance above the bottom of the outlet end of said ditch adjacent the spillway lip.

10. The combination according to claim 9 further including a pool section attached to and communicating with the outlet end of said ditch and having said bottom feeding spillway therein located on the side thereof opposite the side communicating with the outlet end of said ditch.

11. The combination according to claim 10 wherein said spillway means comprises an underwater spillway surface sloping upwardly from the bottom of said pool section to said spillway lip located below the water level in said pool section, and said cofferdam means extends downwardly to a predetermined distance above the bottom of the pool adjacent the lower end of the spillway surface.

12. The combination according to claim 11 wherein said cofferdam means comprises a main plate mounted parallel to and spaced from the sloping surface of said bottom feeding spillway and extending above the normal water level of water in said pool section and above said spillway lip and further including first and second end plates between said main plate and said sloping surface of said spillway, with said main plate spaced from the bottom of said pool section a predetermined distance to permit water and solid wastes to flow thereunder and between said main plate and said spillway surface out over the lip of said spillway to continuously remove solid waste material at a predetermined flow rate of water from said pool section.

13. A self-cleaning aquaculture growing system including in combination:
a first raceway in the form of an elongated ditch having a water inlet end and a water outlet end;
an inclined aeration raceway with an inlet end and an outlet end, wherein the outlet end is interconnected with the inlet end of said elongated ditch of said first raceway and the inlet end is elevated above the outlet end thereof by a predetermined distance, with means in said aeration raceway for causing a violent tumbling action of water passing therethrough;
means for continuously removing solid wastes and water from the bottom of the outlet end of said ditch; and
means for supplying water at a predetermined flow rate to the inlet end of said aeration raceway, said water supplying means comprising means for recirculating a predetermined amount of the water exiting the outlet end of said ditch and combining such recirculated water with a predetermined amount of fresh makeup water to compensate for water removed with the solid waste from the bottom of the outlet end of said ditch.

14. A self-cleaning aquaculture growing system including in combination:
a first raceway in the form of an elongated ditch having a water inlet end and a water outlet end;
an inclined aeration raceway with an inlet end and an outlet end, wherein the outlet end is interconnected with the inlet end of said elongated ditch of said first raceway and the inlet end is elevated above the outlet end thereof by a predetermined distance, with means in said aeration raceway for causing a violent tumbling action of water passing therethrough;
means for continuously removing solid wastes and water from the bottom of the outlet end of said ditch; and
means for supplying water at a predetermined flow rate to the inlet end of said aeration raceway, said flow rate being sufficient to continuously move solid wastes through said first raceway to the outlet end thereof.

* * * * *